C. ELLIS.
HYDROGENATING UNSATURATED BODIES.
APPLICATION FILED MAR. 24, 1916.
1,285,960.
Patented Nov. 26, 1918.
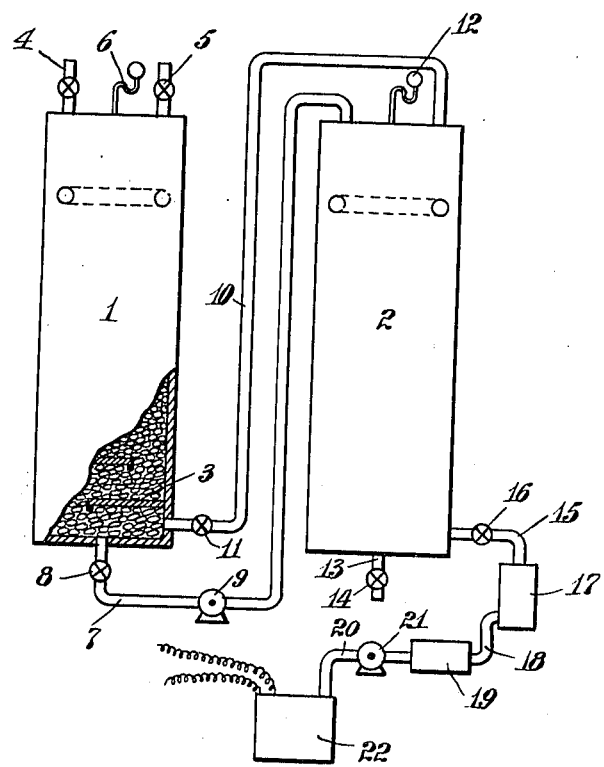

UNITED STATES PATENT OFFICE.

CARLETON ELLIS, OF MONTCLAIR, NEW JERSEY.

HYDROGENATING UNSATURATED BODIES.

1,285,960.  Specification of Letters Patent.  Patented Nov. 26, 1918.

Continuation in part of application Serial No. 686,988, filed March 29, 1912. This application filed March 24, 1916. Serial No. 86,522.

*To all whom it may concern:*

Be it known that I, CARLETON ELLIS, a citizen of the United States, and a resident of Montclair, in the county of Essex and State of New Jersey, have invented certain new and useful Improvements in the Art of Hydrogenating Unsaturated Bodies, of which the following is a specification.

The present invention relates to the hydrogenation of organic materials by methods involving the treatment thereof with hydrogen gas "or gas containing free hydrogen" in the presence of a hydrogen carrier comprising a colloidal non-noble metal catalyst.

This application contains matter disclosed in the file of my former application Serial No. 656,100, filed October 23, 1911, now Letters Patent No. 1,026,156, especially as regards oil colloids or colloidal catalyzers, as well as those catalyzers formed, for example, *in situ* by thermal decomposition, and is in part a continuation of my copending application 686,988, filed March 29, 1912 (now U. S. Patent No. 1,217,118).

Among the various organic materials, in the treatment of which the present improvement is applicable, animal and vegetable oils containing unsaturated ingredients, *e. g.*, cottonseed, castor, linseed, Chinese wood, perilla, soy bean, peanut and fish oils; also crude or refined fatty acids, or other fatty mixtures; also wool grease, resins, especially ordinary rosin, naphthalene; tars and petroleum oils such as asphaltic oils and other asphaltic bodies.

The object of the invention is to prevent deterioration of colloidal catalysts of the nature of nickel especially (also applicable in the case of cobalt, copper, iron and in some cases to chromium, manganese, titanium, vanadium) but generally to metals having atomic weights between 48 and 63, which colloidal metals are extremely sensitive to very small percentages of oxygen. The invention is also applicable when using molybdenum, thorium and zirconium in a state of extreme subdivision (*e. g.* colloidal metal) as the catalyst.

In view of the fact that small quantities, even minute traces of oxygen are detrimental to the catalysts mentioned, I propose to avoid the difficulty by avoiding the presence of oxygen in the system, and hence I employ, in the hydrogenation, hydrogen gas which is free from oxygen.

The process may be carried out by contacting the organic material in liquid state and the hydrogen in the presence of the colloidal catalyst, at temperatures at which the catalyst is effective in producing a union of the hydrogen and unsaturated components of the organic material. This may be effected by counter-current circulation, atomization, spraying or by bubbling the gas through the liquid, or in any other preferred manner.

As a specific example of my process, linseed oil, containing colloidal nickel catalyst to the extent of one per cent., while at a temperature of between 150 and 200° C., say 180° C., is treated in an apparatus such as that shown in my Patent 1,138,201 (Figure 2) or that shown in my Patent 1,154,495 (Fig. 1, or Fig. 2) with hydrogen, in the entire absence of free oxygen, and in the absence of materials having any poisoning or other deleterious effect upon the catalyst. The operation may be carried out under a pressure of, say, 10 to 25 lbs. per square inch, and under these conditions any nickel soap produced by the action of the free fatty acid of the oil on the nickel catalyst, is quickly decomposed.

The treatment is continued until the desired amount of hydrogen is added, after which the catalyst is removed from the bulk of the oil for further use.

In order to produce the initial mixture of colloidal catalyst and organic material, it is preferable to dissolve a readily reducible or decomposable metallo-organic body in the organic material in a liquid state, and to decompose the same. As an example of this procedure, I may dissolve nickel oleate in an oil and then subject such mixture as a flowing stream to the action of a counter current of hydrogen or water gas, in the absence of free oxygen at an elevated temperature, whereby catalytic colloidal nickel is produced.

In many cases the presence of oxygen brings about a tendency to flocculation of the catalyzer and when such agglomeration occurs much or all catalytic efficiency disappears, and such portion as may still have catalytic action usually exhibits a strong tendency to settle owing to some change in physical state.

It is preferable to remove dissolved oxygen from the oil before hydrogenation, for example by heating or by treating with hydrogen at an elevated temperature.

In the accompanying diagrammatic drawings, an illustrative form of treating apparatus which may be employed hereunder is shown in elevation with a portion of one tower shown in section. In the drawing 1 and 2 are containers or towers of considerable height. These towers may if desired be packed with granular material of a non-metallic nature, such for example, as granules of charcoal, or if desired, with non-metallic material carrying or retaining a metallic catalyzer, the non-metallic material being active or inactive as the case may be. The towers have baffles in some cases and as shown at 3, the baffles have a lip which allows the gases to collect at the other side of the baffles to form gas-pockets. 4 is the outlet for the gas discharging at 1, and this gas may be carried back to the tower 2 and travel through the system in a cyclic path preferably after having been washed. The oil enters at the inlet 5. 6 is a pressure gage. The tanks 1 and 2 are shown heated by steam coils through which superheated steam may be passed. A pipe 7 leads from the lower part of the tower 1 to the upper part of the tower 2 and serves to convey hydrogen gas from the latter to the former. An oil main runs from the top of the tank 2 to the bottom of the tank 1. Hydrogen is generated in the electrolytic cell, 22 and is forced by the pump 21 into the purifiers 19 and 17, in which it is freed from chlorin, then while substantially free from traces of oxygen gas, passes into the tower 2, moves upwardly therethrough and then is forced into the tower 1 where it travels upwardly in the same manner coming in intimate contact with the oil which is flowing in the opposite direction and being heated and if needful compressed to the point required for the most effective reaction. Finally any residual gases discharging at 4 may be taken back to the pump 21 and used again in the system in so far as they may contain any useful hydrogen content.

The oil entering at 5 with or without a colloidal or finely divided catalyzer flows downwardly through the tower 1 and then is forced into the tower 2 under a pressure sufficient to enable the oil to move freely against the pressure of the hydrogen gas.

What I claim is:—

In the process of hydrogenating organic materials, the herein described improvement which comprises reacting upon such materials in the presence of a colloidal catalyst with hydrogen gas free from oxygen and chlorin.

CARLETON ELLIS.